US006653592B2

(12) United States Patent
Andersen

(10) Patent No.: US 6,653,592 B2
(45) Date of Patent: Nov. 25, 2003

(54) APPLIANCE FOR THE SURFACE TREATMENT OF COATED ELEMENTS

(76) Inventor: Svein Andersen, Schneitstrasse 94, CH-6315 Oberägeri (CH)

( * ) Notice: Subject to any disclaimer, the term of this patent is extended or adjusted under 35 U.S.C. 154(b) by 0 days.

(21) Appl. No.: 10/052,461

(22) Filed: Jan. 23, 2002

(65) Prior Publication Data

US 2002/0100748 A1 Aug. 1, 2002

(30) Foreign Application Priority Data

Jan. 30, 2001 (CH) .............................................. 0163/01

(51) Int. Cl.[7] .............................................. B23K 26/00

(52) U.S. Cl. .............................. 219/121.68; 219/121.67

(58) Field of Search ....................... 219/121.68, 121.67, 219/121.79, 121.8, 121.82

(56) References Cited

U.S. PATENT DOCUMENTS

| | | | | |
|---|---|---|---|---|
| 3,953,706 A | * | 4/1976 | Harris et al. | 219/121 L |
| 4,194,814 A | | 3/1980 | Fischer et al. | |
| 4,761,535 A | * | 8/1988 | Lawson | 219/121.68 |
| 4,931,616 A | * | 6/1990 | Usui et al. | 219/121.68 |
| 5,140,873 A | * | 8/1992 | Schwartzman | 81/9.43 |
| 5,321,227 A | * | 6/1994 | Fuchs et al. | 219/121.68 |
| 5,343,605 A | * | 9/1994 | Nazerian et al. | 29/33 M |
| 5,521,352 A | * | 5/1996 | Lawson | 219/121.67 |
| 5,522,130 A | | 6/1996 | Wollermann | |
| 5,645,739 A | | 7/1997 | Nakata et al. | |
| 5,837,961 A | | 11/1998 | Miller | |
| 6,509,547 B1 | * | 1/2003 | Bernstein et al. | 219/121.68 |

FOREIGN PATENT DOCUMENTS

| | | |
|---|---|---|
| DE | 197 38 928 A1 | 3/1999 |
| EP | 0 979 710 A1 | 2/2000 |
| FR | 2 774 559 A1 | 8/1999 |
| FR | 2 791 915 A1 | 10/2000 |

OTHER PUBLICATIONS

J.D. Gibson, The Communications Handbook, CRC Press LLC, Boca Raton 1997, p. 777.

* cited by examiner

*Primary Examiner*—M. Alexandra Elve
(74) *Attorney, Agent, or Firm*—Oliff & Berridge, plc

(57) ABSTRACT

The appliance is used for the surface treatment of coated elements (3; 30; 300), in particular of cables, the coating (31, 310) of which is removed or separated by means of at least two laser diodes (1*a*, . . . , 1*h*). The laser diodes 1*a*, . . . , 1*h*) are mounted on a mounting body (2; 5; 200) and are or can be oriented and moved in such a manner that the coating (31, 310) of an element (3; 300) is removed or separated at an intended location. It is preferable to use a hollow-cylindrical mounting body (2; 5; 200), which is fitted with an odd number of laser diodes (1*a*, . . . , 1*h*) which are distributed uniformly over the mounting body (2; 5; 200).

16 Claims, 6 Drawing Sheets

Figure 1:
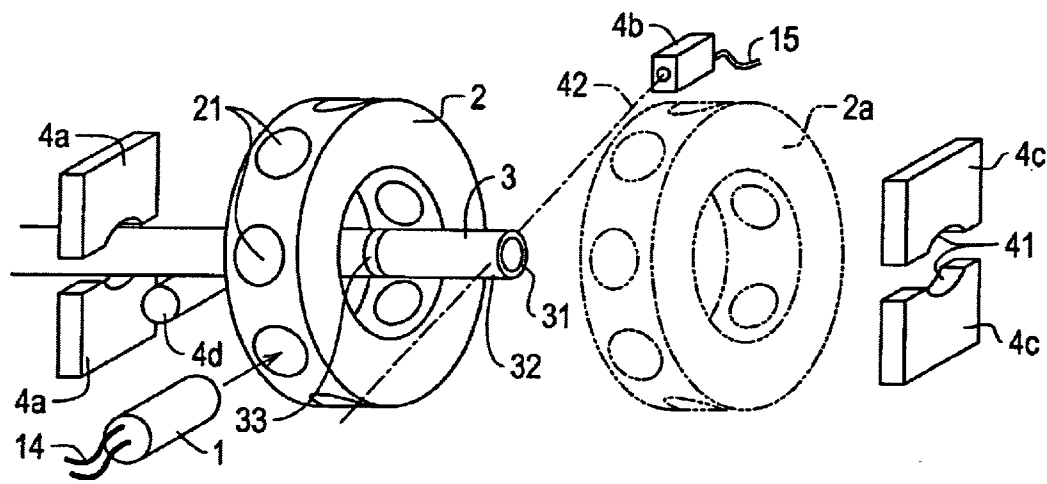

4b
15
42
2a
21
2
4a
3
4c
41
31
4c
4d
32
4a
33
14
1

APPLIANCE FOR THE SURFACE TREATMENT OF COATED ELEMENTS

The invention relates to an appliance for the surface treatment of coated elements, in particular for the stripping or separation of insulating layers on electrical or optical conductors, in accordance with the preamble of patent claim 1.

An appliance which is used to remove the insulating layer from an insulated conductor is described in U.S. Pat. No. 5,837,961. This appliance has a high-power laser unit, the beam from which is alternately guided, via a plurality of mirrors on two opposite sides of the conductor, onto an insulating layer which is to be removed. The mirrors, which are coupled to a motor via spindles, rods and belts, are for this purpose driven synchronously and moved cyclically.

This known appliance therefore has a complex drive mechanism and relatively expensive mirrors which, at least during production, are to be aligned precisely and subsequently are to be checked and cleaned at regular intervals.

The use of two radiation paths allows more efficient removal of the insulating layers. To increase the number of zones at which insulating material is removed simultaneously, the mirror system would have to be extended, which would entail outlay which is scarcely economically viable.

Furthermore, the controllability of the known appliance is very restricted. If insulating material is to be removed at only one zone, one of the beam paths must, for example, be mechanically interrupted or the mirror drive has to be limited to a selected rotational range.

Therefore, the present invention is based on the object of providing an appliance which can be produced at low cost and is substantially maintenance free and which is suitable for efficient surface treatment of coated elements.

This object is achieved by an appliance which has the features given in claim 1. Preferred configurations of the invention are given in further claims.

The appliance, which is used for surface treatment of coated elements, in particular for separating or removing insulating layers, has at least two laser diodes as laser sources, which are mounted on a mounting body and are or can be oriented in such a manner that the coating of an element can be removed or separated at an intended location.

The laser diodes are mounted on a stable mounting body and are oriented in such a manner that a coated element which has been introduced into the appliance can be exposed to laser beams at the zones provided for this purpose, so that the zone in question can be completely removed or separated by the action of the laser and can be processed using a further tool. By way of example, an insulating layer which is to be removed is separated close to the end of the conductor or cable, where it is mechanically taken hold of by a tool and is then pulled off over the end piece. On the other hand, it is possible for the insulating layer which is to be removed to be scanned or moved over by laser beams until the layer is completely detached.

In this context, it is particularly advantageous, in particular, that there is no need for a system of mirrors, since the laser diodes on the mounting body are oriented or can be oriented by rotation in such a manner that the laser beams can be fed directly, and therefore without attenuation, to the layers which are to be removed. The mounting body can preferably be rotated and/or displaced in the axial direction along the element which is to be processed, so that larger zones can be processed.

The processing rate, which is dependent on the radiation output delivered, can be increased by using a greater number of laser diodes which act simultaneously on different locations of a layer which is to be removed or separated.

By switching off individual laser diodes, it is also possible to effect only partial removal or separation of layers.

By switching off individual laser diodes or reducing the power of individual or all the laser diodes, it is also possible for the radiation power to be adapted to the elements which are to be processed and their coatings, in particular the layer thicknesses.

Furthermore, a deliberate orientation of the laser diodes prevents the laser beam of a laser diode from being able to damage an adjacent laser diode.

In a preferred configuration of the invention, the laser diodes, moreover, are oriented as a function of the dimensions of the elements which are to be processed. The laser diodes are preferably set in such a manner that the laser beams run tangentially with respect to a circle whose radius is selected according to the position and dimension of the coating which is to be removed or separated. The rotational angle of the laser diodes is preferably set in a simple manner by means of a ring which surrounds the mounting body and can rotate relative to the latter.

In a further preferred configuration, the mounting body which is equipped with the laser diodes is selected in such a manner that planar surfaces of an element, for example the sides of ribbon cables or circuit boards on which components are to be mounted, can be processed.

The orientation, movement and operation of the laser diodes or of the mounting body are advantageously controlled by means of a master computer, which simultaneously controls the supply and positioning of the coated elements and, if appropriate, of tools which are used to process the elements.

Furthermore, the material of the mounting body and any mounting means are preferably selected in such a manner that the heat which is generated by power loss is dissipated from the laser diodes. In a preferred configuration, the mounting body also has cooling ribs, by means of which the thermal energy is released to the ambient air, preferably to an air flow which simultaneously serves to extract vapors and particles which may form during the processing of the coated elements.

Figure 2:
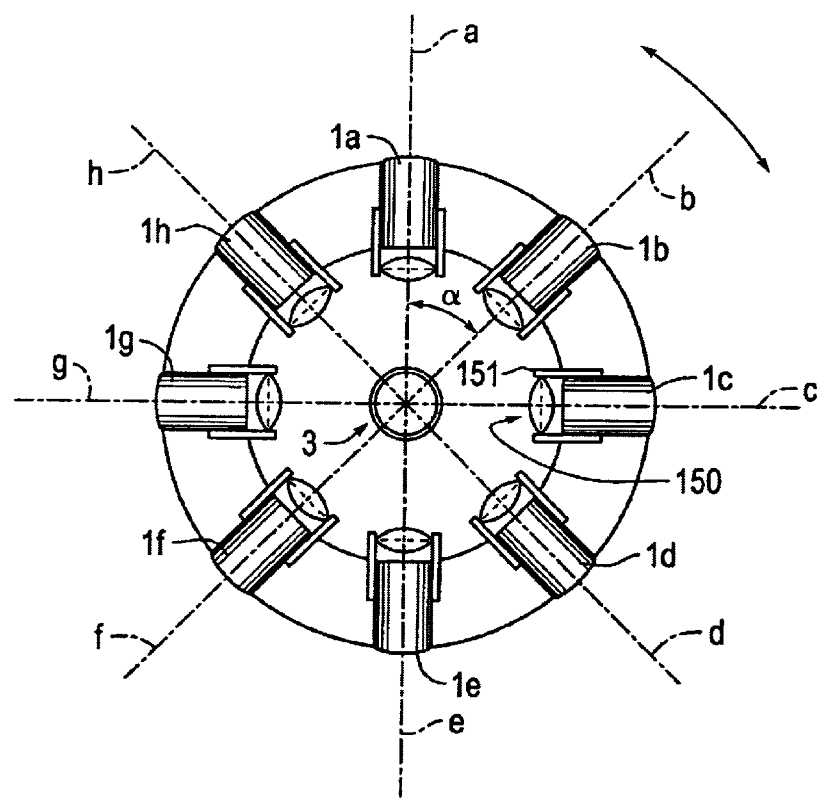
Figure 3:
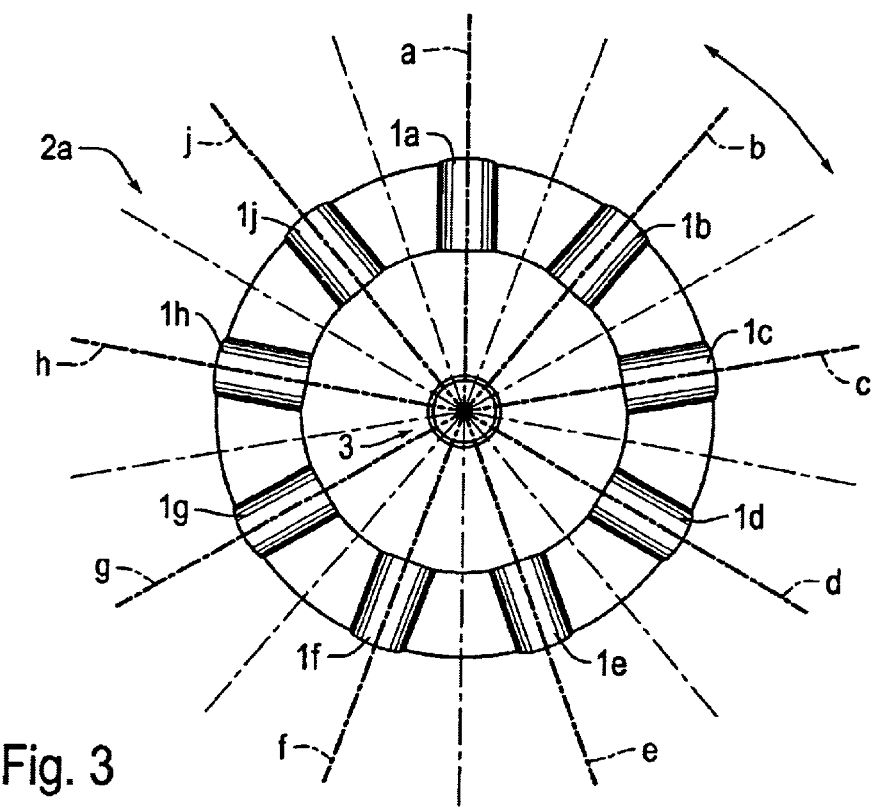

The invention is explained in more detail below with reference to a drawing, in which:

FIG. 1 shows the hollow-cylindrical mounting body 2 of an appliance according to the invention which is fitted with laser diodes 1 and into which an element 3 to be processed has been introduced, FIG. 2 shows the hollow-cylindrical mounting body 2 shown in FIG. 1 with eight laser diodes 1*a*, . . . , 1*h* fitted therein, FIG. 3 shows a mounting body 2*a* with nine mounted laser diodes 1*a*, . . . , 1*j*, the beams of which, on the opposite side, cannot impinge on a laser diode 1*a*; . . . , 1*j,*

Figure 4:
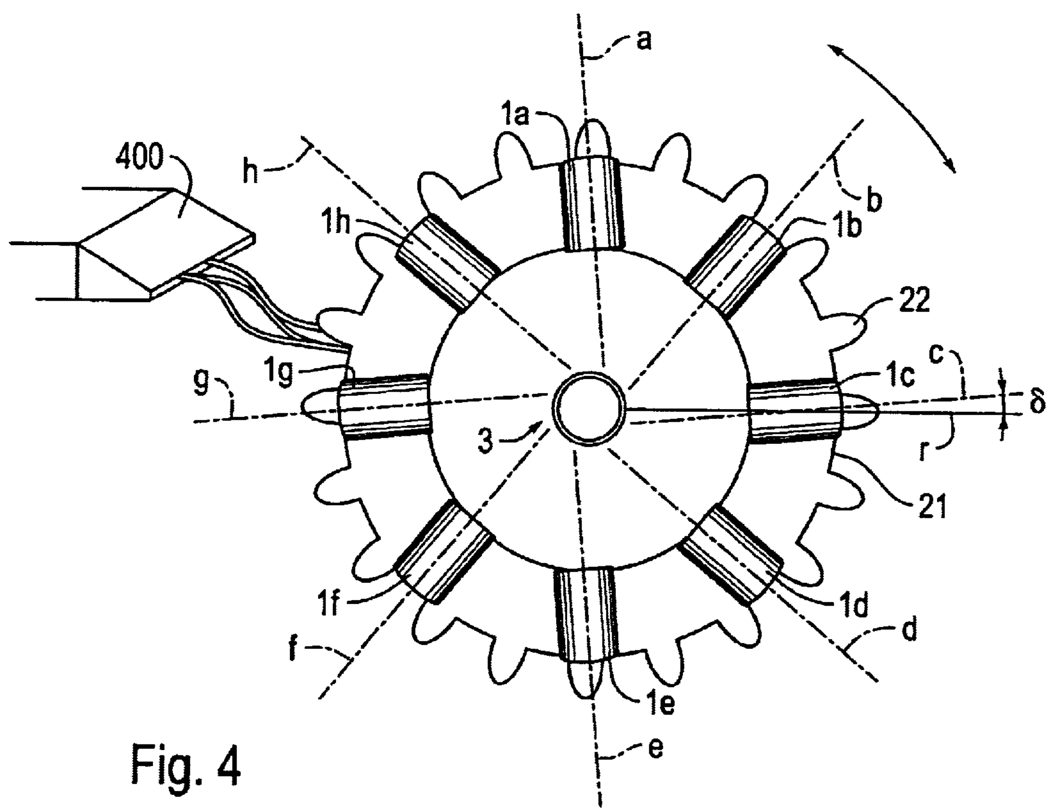

FIG. 4 shows a mounting body 2*b* with eight evenly distributed but inclined laser diodes 1*a*, . . . , 1*h,*

Figure 5:
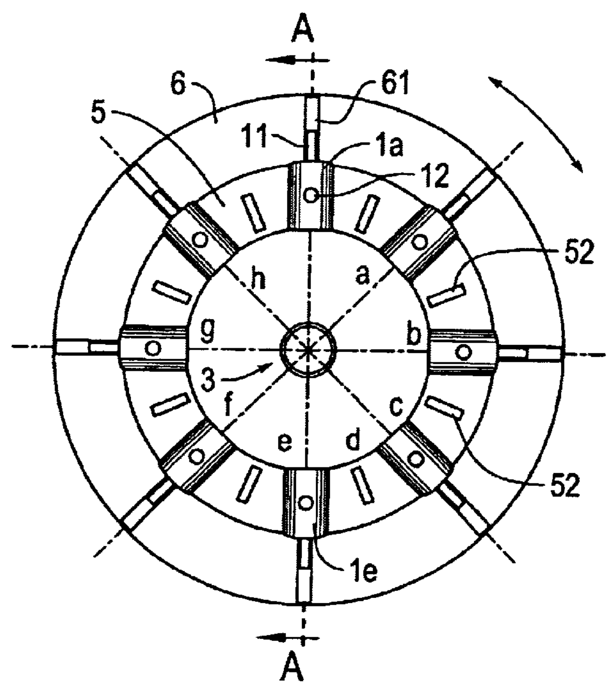

FIG. 5 shows a mounting body 5, which is illustrated in section, with rotatably mounted laser diodes 1*a*, . . . , 1*h* and a ring 6 which surrounds the mounting body 5 and is used to adjust the angle of inclination δ of the laser diodes 1*a*, . . . , 1*h,*

Figure 6:
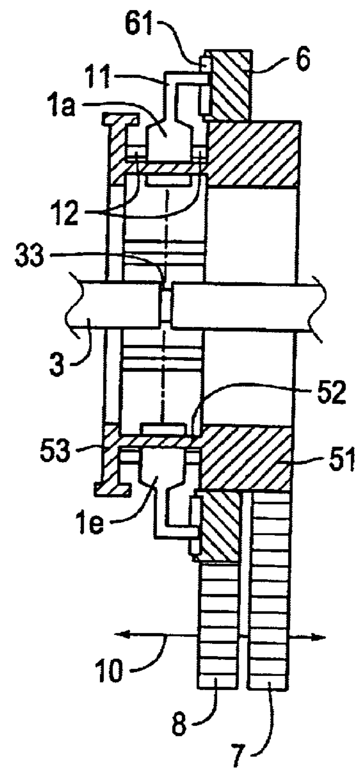
Figure 7:
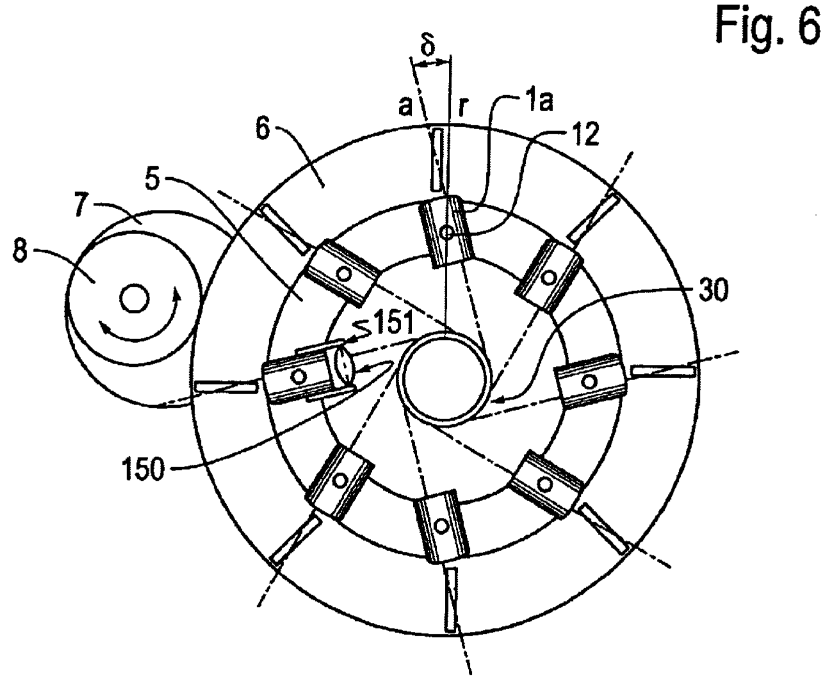
Figure 8:
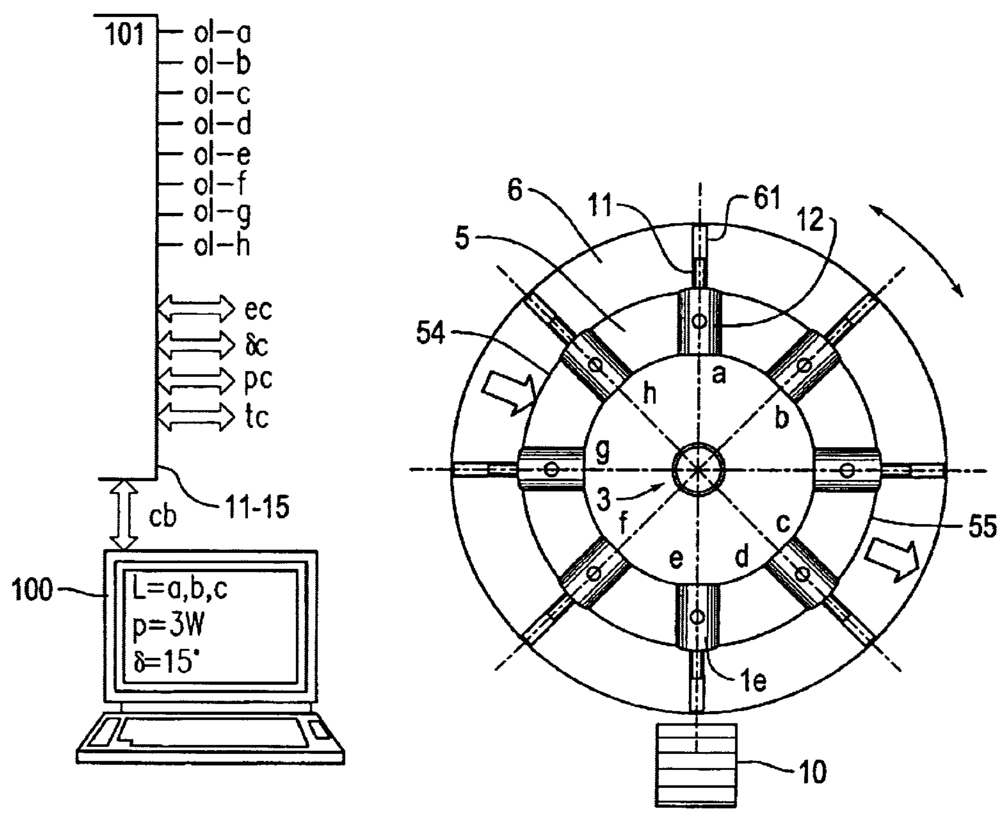
Figure 9:
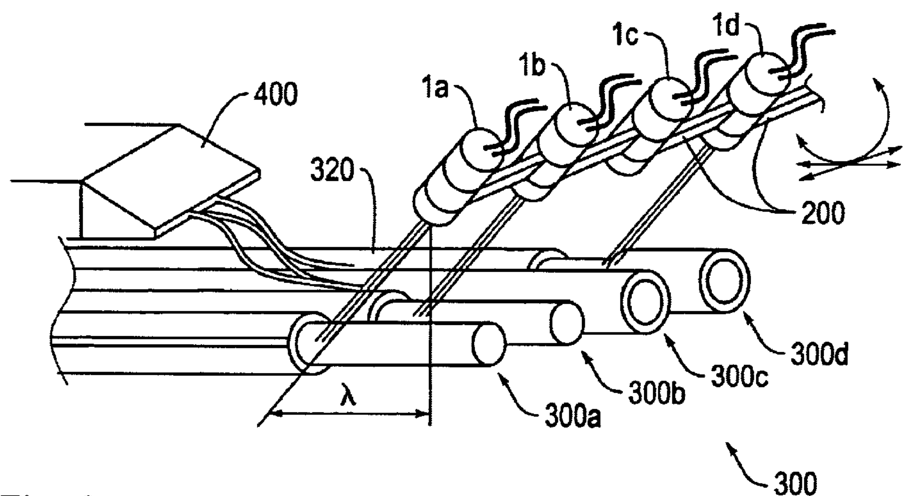
Figure 11A:
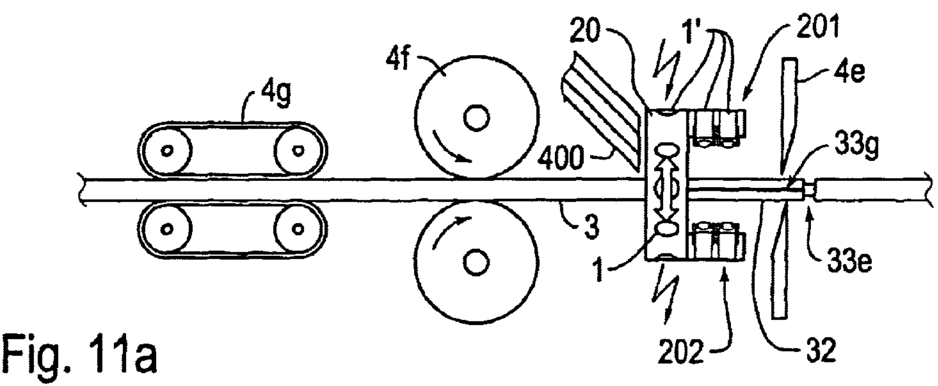
Figure 11B:
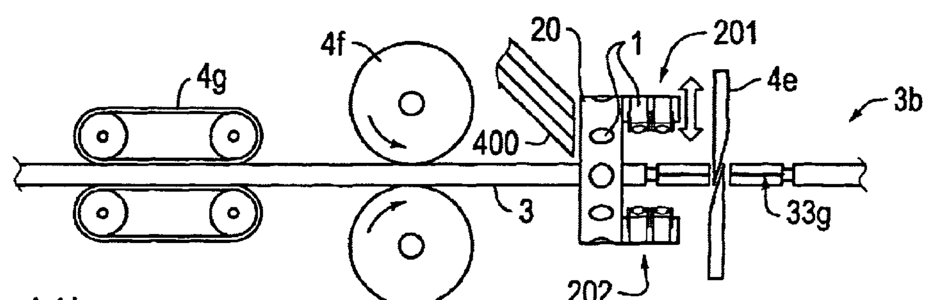
Figure 11C:
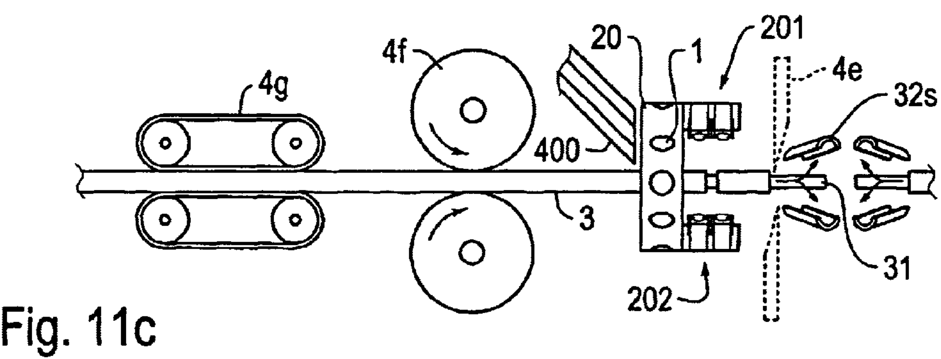
Figure 12:
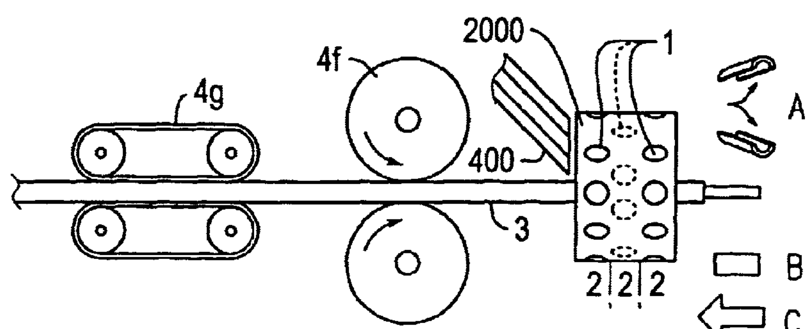

FIG. 6 shows the mounting body 5 and the ring 6 with associated drive means 7 and 8 in section on line A—A from FIG. 5, FIG. 7 shows the mounting body 5 and the ring 6 from FIG. 5 and FIG. 6, rotated in such a manner with respect to one another that the radiation axes of the laser diodes 1*a*, . . . , 1*h* run tangentially with respect to the surface of an element 30, FIG. 8 shows the mounting body 5 and the ring 6 from FIG. 5 with an appliance 10 for axial displacement and with a control installation 100, 101, FIG. 9. shows an elongate mounting body 200 with laser diodes 1*a*, . . . , 1*d* which are oriented parallel with respect to one another and by means of which a planar surface of a coated element 300 is processed, FIG. 10 shows an appliance according to the invention in various phases during the processing of an element 3, FIG. 11 shows an appliance according to the invention with a widened mounting body 20 which is suitable for making longitudinal slots and transversely running annular slots, and FIG. 12 shows an appliance according to the invention with a widened mounting body 2000 with laser diodes 1 arranged next to one another in the axial direction.

FIG. 1 diagrammatically depicts the essential parts of the appliance according to the invention, which is used for the surface treatment of coated elements, in particular for the stripping or separation of insulating layers on electrical or optical conductors. The figure shows a hollow-cylindrical mounting body 2 with approximately radially running openings 21, into which laser diodes 1 can be inserted in such a manner that laser radiation which is emitted impinges on an element 3 which has been introduced into the mounting body 2 and has an optical or electrical conductor 31 and has at least one insulating layer 32 surrounding this conductor 31.

Means, such as rollers, belts, gripper tools and sensors, for conveying and positioning the elements which are to be processed are known to the person skilled in the art, for example from U.S. Pat. No. 5,522,130, which describes an appliance for positioning conductors or wires and cables. In said appliance, the position of the element to be processed is measured by means of a laser appliance. By contrast, the insulation layer is separated by means of a cutting tool.

FIG. 1 shows a conveying and holding appliance 4*a*, which is in the form of a pair of jaws, a support roller 4*d* and a measuring appliance 4*b*, which are used to position the introduced element 3. The figure also shows a separation location 33, at which the insulating layer 32 is separated and can be taken hold of by a tool 4*c* and pulled off. For this purpose, the tool 4*c* has two clamp parts, which are provided with a recess 41 which matches the element 3.

The measuring appliance 4*b* and the laser diodes 1 are provided with connection lines 14, 15 which are connected, for example, to the control appliance 100, 101 shown in FIG. 8.

The outputs of the laser diodes 1 are preferably in the range from 1 watt to 5 watts, and an appropriate number of laser diodes is present. The use of a plurality of laser diodes not only allows the power of the individual laser diodes to be reduced, but also allows a line or an area to be scanned more accurately and more quickly. By way of example, it is advantageous to use about ten laser diodes, each with an output of 1–2 watts. Laser diodes belonging to this output class can be obtained, for example, from Laser Diode Incorporated (cf.: www.laserdiode.com).

Furthermore, there are means (cf. FIG. 6, ring 6 and drive wheels 7, 8) which can be used to hold and rotate the mounting body 2.

FIG. 2 shows the hollow-cylindrical mounting body 2 from FIG. 1 with eight laser diodes 1*a*, . . . , 1*h* fitted therein, which are distributed uniformly over the mounting body 2 and are directed radially inward, toward its longitudinal axis, along which the element 3 to be processes has been introduced. Furthermore, holders 151 having a lens system, which preferably comprises a single lens 150, have been inserted into the apertures 21 in such a manner that the laser beams emitted by the laser diodes 1*a*, . . . , 1*h* are or can be focused by means of the lens systems. Preferably, each aperture 21 has a screw thread, into which a holder 151, which is likewise provided with a screw thread, can be screwed until the laser beam is focused, taking account of an element which is to be processed. The lens systems are preferably used in all the configurations of the invention which are described and illustrated.

When the apparatus with the mounting body 2 shown in FIG. 2 is operating, the laser beams impinge at right angles on the surface of the element 3 which is to be processed. If the laser diodes 1*a*, . . . , 1*h* are switched on without the element 3 which is to be processed having been introduced, the laser beams can penetrate into an adjacent laser diode 1*a*; . . .; 1*h* and destroy the latter. Consequently, it is preferable for the laser diodes 1*a*, . . . , 1*h* to be offset or rotated or inclined with respect to one another, until the laser diodes 1*a*, . . . , 1*h* cannot have an adverse effect on one another.

The arrangement shown in FIG. 3 with an odd number of laser diodes (in the present case nine laser diodes) 1*a*, . . . , 1*j*, which can be distributed uniformly over the mounting body 2*a* without affecting one another, is particularly advantageous. As a result, uniform distribution of the radiation energy over the surface of the element 3 which is to be processed during operation of the appliance continues to be ensured.

FIG. 4 shows a mounting body 2*b* with eight laser diodes 1*a*, . . . , 1*h* which are distributed uniformly but are mounted in an inclined position. This arrangement too prevents the laser diodes 1*a*, . . . , 1*h* from affecting one another. The apertures or bores 21 in the mounting body 2*b* are correspondingly angled, so that the laser beams are inclined by the angle $\delta$ relative to the radius r through the axes of rotation of the laser diodes 1*a*, . . . , 1*h*. The angle $\delta$ is selected in such a manner that the possibility of laser beams from one laser diode 1*a*; . . . ; 1*h* impinging on an adjacent laser diode 1*a*; . . . ; 1*h* is avoided.

The mounting body 2*b* is also provided with cooling fins 22, by means of which the thermal energy generated by the laser diodes 1*a*, . . . , 1*h* can be dissipated to the ambient air. The thermal energy is preferably released to an air flow which is generated by a vacuum unit 400 and simultaneously serves to extract vapors and particles which may form during the processing of the coated elements. Therefore, the vacuum unit 400 is preferably also operated, at least from time to time, even after laser operation has already been concluded.

FIG. 5 shows a mounting body 5 in which eight laser diodes 1*a*, . . . , 1*h* are mounted rotatably. It can be seen from FIG. 6, which shows a sectional illustration (on line A—A from FIG. 5) of the mounting body 5, that the mounting body 5 comprises two hollow-cylindrical elements 51, 53 which are connected to one another by connecting elements 52 and between which the laser diodes 1*a*, . . . , 1*h* are rotatably mounted. For this purpose, the laser diodes 1*a*, . . . , 1*h* are provided with shafts 12 which are directed along the axis of rotation and are inserted into the hollow-cylindrical elements 51, 53. At the radially outer ends, the laser diodes 1*a*, . . . , 1*h* have a lever 11 which is guided inside a groove 61 in a ring 6 which surrounds the mounting body 5 and can rotate relative to the latter. By way of example, the ring 6 is connected to the mounting body 5 by means of a screw thread. When the ring 6 rotates relative to the mounting body 5, the lever 11 of each laser diode 1*a*; . . . ; 1*h* is pulled through the associated groove 11 in the corresponding direction, with the result that a desired angle δ is established, about which each laser diode 1*a*; . . . ; 1*h* is rotated.

In the arrangement shown in FIG. 7, the mounting body 5 and the ring 6 have been rotated with respect to one another in such a manner that the axes a, . . . , h of the laser diodes 1*a*, . . . , 1*h* run tangentially with respect to the surface of an element 30 which is to be processed.

Controlled appliances 7, 8, which can be used to effect a desired rotation of the mounting body 5 with the ring 6 rotating with it, or only a rotation of the ring 6, are preferably provided for the purpose of driving mounting body 5 and ring 6, with the result that an angle of inclination δ which is selected according to the element 30 which is to be processed can be set. Therefore, a surface region of the element 30 can be scanned or processed by the laser beams through rotation of the laser diodes 1*a*, . . . , 1*h* or, if the angle of inclination δ is kept constant, through rotation of the mounting body 5 (with the ring 6 rotating with it). There is preferably a further drive appliance 10, which can be used to displace the mounting body 5 axially along the element 3, 30, so that surface zones can be covered by the laser beams.

As shown in FIG. 8, the drive appliances 7, 8 and 10 are preferably controlled by a computer 100, which is connected to a driver unit 101 via a control bus cb. The driver unit 101 is connected to laser diodes 1*a*, . . . , 1*h* via output lines ol-a, . . . , ol-h and is also connected to the measuring appliance 4*b* via an input line il-15. A possible electric circuit for a laser diode is shown, for example, in J. D. Gibson, THE COMMUNICATIONS HANDBOOK, CRC Press LLC, Boca Raton 1997, page 777. The driver unit 101 is also connected, via a control bus δ c, to the drives 7, 8 for setting the angle δ and for rotating the mounting ring 5, is connected via a control bus pc to the drive 10 for axially displacing the mounting ring 5, is connected via a control bus ec to the drives which are used to convey and position the elements 3, 30 and is connected via a control bus tc to tools 4*c* which can be used to process the elements 3, 30.

It can be seen on the screen of the computer shown in FIG. 8 that that the laser diodes 1*a*, 1*b* and 1*c* are to be selected and operated at a power of 3 watts. The angle of inclincation δ is to be set to 15°. Furthermore, it is possible for the diameter of an element 3 to be recorded by means of the measuring appliance 4*b* and for the angle of inclination δ to be set accordingly. Furthermore, it is possible for the laser diodes 1*a*, . . . , 1*h* to be switched on only when a coated element 3 has been introduced in the appliance.

To avoid high operating temperatures, it is also possible for a cooling medium to be supplied to the mounting body 5 via input and output lines 54, 55.

FIG. 9 shows an elongate mounting body 200 with laser diodes 1*a*, . . . , 1*d* which are oriented parallel to one another and by means of which a planar surface of a coated element 300 or of the ribbon cable shown is being processed in segments. The laser diodes 1*a*, 1*b* and 1*d* are switched on and have removed segments of an insultating layer 320 and partially uncovered the metallic conductors 300*a*, 300*b* and 300*c* below. The laser diodes 1*a*, . . . , 1*d* can preferably be guided in a plane by the mounting body 200 and can also rotate over a desired angle δ, so that the laser beams impinge obliquely on the surface of the element 300, for example on a circuit board, with improved efficiency. Parts which are detached are preferably sucked out by a vacuum unit 400, in order to avoid disruptive contamination.

FIG. 10 shows an appliance according to the invention in various phases during the processing of a cable 3 which is provided with an insulating layer 32. During the preferred processing sequence illustrated, pieces of cable 3*b* with stripped ends on both sides are produced.

Figure 10A:
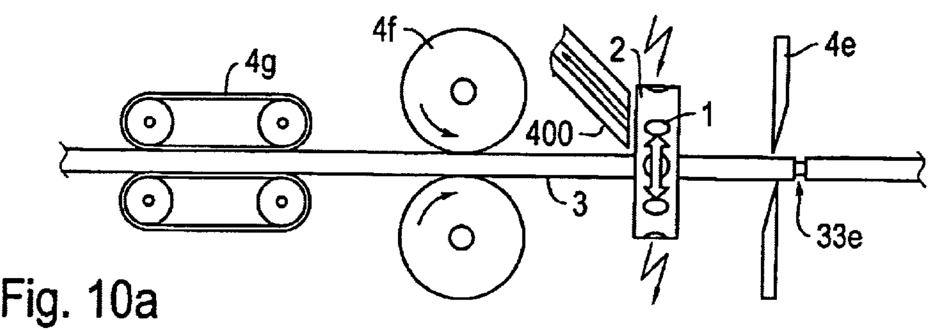

FIG. 10*a* shows that a first separating location 33*e* has already been produced and the cable 3 has been advanced by means of a conveying appliance 4*g* and then stopped again. In the position shown, the laser diodes 1 are active during rotation of the mounting body, so that a second separating location 33*f* is produced. Vapors which form and particles which become detached are sucked out by a vacuum unit 400. The accurate displacement of the cable 3 is effected by means of a measuring appliance 4*f*, which is connected to a master computer 100 (cf. FIG. 8) used to control the conveying appliance 4*g*.

Figure 10B:
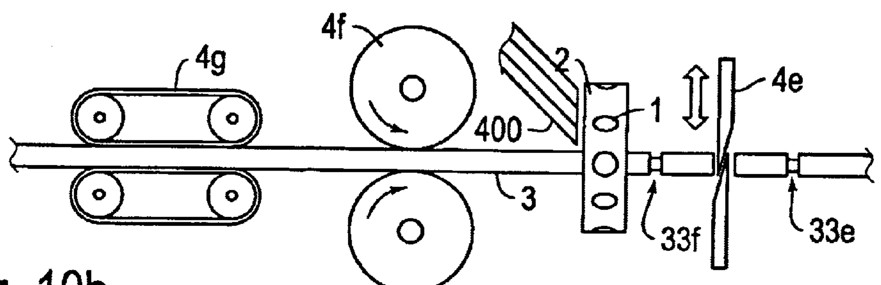

FIG. 10*b* shows the appliance after the cable 3 has been advanced as far as the location at which two oppositely directed blades of a combination tool 4*e* lie precisely between the separating locations 33*e*, 33*f* produced, so that a piece of cable 3*b* can be severed by means of a shearing operation.

Figure 10C:
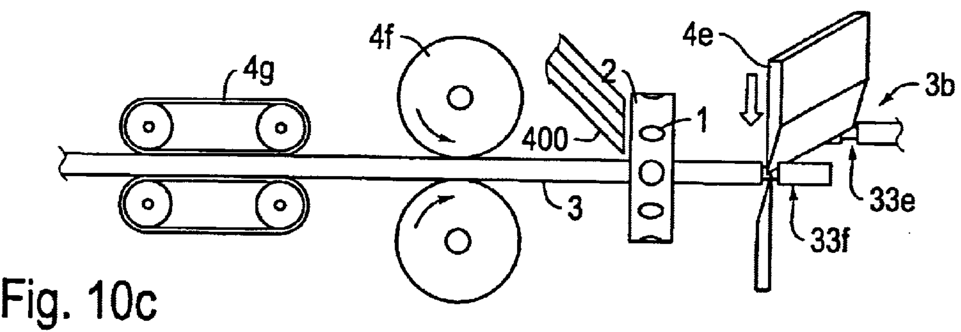
Figure 10D:
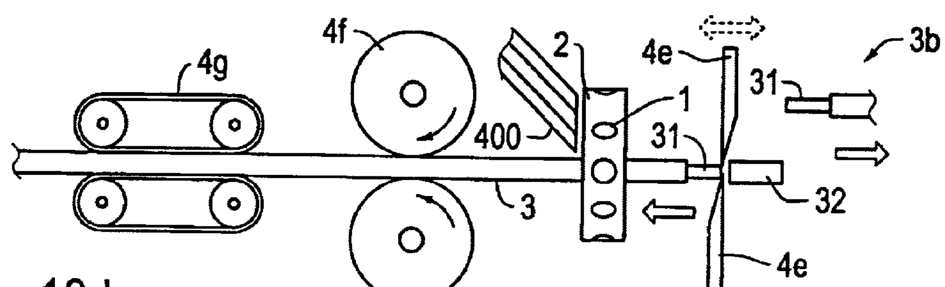

FIG. 10*c* shows the appliance after the cable 3 has been advanced and the piece of cable 3*b* moved back until the separating locations 33*e* and 33*f* lie at the blades of the combination tool 4*e*. Furthermore, the blades have been displaced with respect to one another sufficiently far, without damaging the metallic conductor 31, for the insulating layers which have been separated to be held, while the cable 3, as shown in FIG. 10*d*, has been pulled away again, with the result that the metallic conductor 31 is uncovered at the relevant ends of the cable 3.

Naturally, further configurations of the invention are possible. By way of example, the combination tool 4*e* may be mounted displaceably in the conveying direction, so that the detached insulation pieces can be removed by displacement of the combination tool 4*e* and there is no need for the cable 3 to be advanced and separated pieces of cable 3*b* to be moved back. Furthermore, it is possible to use two or more mounting bodies 2 which are provided with laser diodes 1 and can preferably be mounted at positions which can be selected as desired in the conveying direction of the cable 3.

If necessary, supporting and holding elements are provided for the purpose of holding and supporting the cable 3 and pieces of cable 3*b* which have been severed (cf. FIG. 1). FIG. 11 shows an appliance according to the invention with a widened mounting body 20, which is suitable for making longitudinal slots 33*g* and transversely running annular slots 33*e*, 33*f* in the insulating layer 32 of a cable 3.

Therefore, as the cable 3 advances, a part of the insulating layer 32 which is to be severed is provided with one or more longitudinal slots, preferably with two longitudinal slots 33*g*. Then, the cable 3 is stopped and, as shown in FIG. 11*a*, provided with an annular slot 33*f* through rotation of the mounting ring 20 with activated laser diodes 1. After the severing of the leading piece of cable 3*b* as shown in FIG. 11*b*, the resulting insulation shells 32*s* drop off of their own accord or are detached manually or mechanically (cf. FIG. 11*c*).

To increase the intensity of the laser radiation, the mounting body has at least one row 1' of laser diodes, which are arranged one behind the other in the axial direction and can preferably be switched on separately by the control unit 100 during the longitudinal displacement of the cable 3, so that the longitudinal slot 33*g* can be created to the required depth. The additional rows 1' of laser diodes 1 may be arranged on support elements 201, 202 of the mounting body 20.

However, as shown in FIG. 12, it is also possible to use an expanded mounting body 2000, on which, in addition to a first ring of laser diodes 1, one or more further laser diode rings or one or more axially oriented rows of laser diodes 1 are arranged. The extended mounting body 2000 can be created from a single piece or may be formed from two or more simple mounting bodies 2 which are connected to one another. By suitable control of the individual laser diodes 1 and of the extended mounting body 2000, it is possible for, A, shell pieces or, B, undivided tubular pieces to be severed or, C, larger elements (windows, sleeves) to be completely removed or detached from insulation layers.

What is claimed is:

1. An appliance for the surface treatment of coated elements (3; 30; 300), in particular of cables, the coating (32, 320) of which can be removed or separated by means of at least one laser source, wherein at least two laser diodes (1*a*, . . . , 1*h*) are used as laser sources and are mounted in a mounting body (5) and are or can be oriented in such a manner that the coating (32, 320) of an element (3; 300) can be removed or separated at an intended location, wherein the laser diodes (1*a*, . . . , 1*h*) are mounted rotatably in said hollow-cylindrical mounting body (5) and can preferably be adjusted, in such a manner that the laser beams run tangentially with respect to a circle whose radius can be adjusted according to the position of the coating which is to be removed or separated.

2. The appliance as claimed in claim 1, wherein the laser diodes (1*a*, . . . , 1*h*) are mounted on an elongate mounting body (200) and are oriented parallel to one another, or wherein the mounting body (2; 20; 2000), into which elements (3; 30) which are to be processed can be introduced in the axial direction, is of hollow-cylindrical design and is provided with apertures (21) which are used to receive the laser diodes (1*a*, . . . , 1*h*).

3. The appliance as claimed in claim 1, wherein optionally adjustable lens systems (150, 151) are provided, by means of which the beams emitted by the laser diodes (1*a*, . . . , 1*h*) can be focused.

4. The appliance as claimed in claim 3, wherein the lens systems (150, 151) have holders (150) which can be screwed into the apertures (21) in the mounting body (2; 20; 2000) and in this way can be adjusted.

5. The appliance as claimed in claim 1, wherein the apertures (21), preferably in an uneven number, are oriented or arranged in or along the mounting body (2; 20; 2000) in such a manner that the radiation axes (a, . . . , h) of the laser diodes (1*a*, . . . , 1*h*) do not run through the emission aperture of an adjacent laser diode (1*a*; . . . ; 1*h*).

6. The appliance as claimed in claim 1, wherein the laser diodes (1*a*, . . . , 1*h*) can be adjusted, by means of a ring (6) which surrounds the mounting body (5).

7. The appliance as claimed in claim 6, wherein the laser diodes (1*a*, . . . , 1*h*) have levers (11) which are each guided in an associated groove (61) in the ring (6).

8. The appliance as claimed in claim 1, wherein the mounting body (20; 2000) is expanded, if appropriate widened or provided with carrier elements 201, 202, at least one row (1') of light-emitting diodes (1) and/or two or more light-emitting diode rings (1) being arranged in the axial direction.

9. The appliance as claimed in claim 2, wherein the mounting body (2; 5; 20; 200; 2000) is mounted by at least one of rotatably and axially displaceably, and wherein the laser diodes (1*a*, . . . 1*h*) are rotatably mounted, so that the beams of the laser diodes (1*a*, . . . , 1*h*) can be used to process a surface or a line running axially or transversely thereto.

10. The appliance as claimed in claim 9, wherein appliances or appliance parts (7, 8; 10) are provided for rotating and/or axially displacing the mounting body (2; 5; 20; 200; 2000) and/or the ring (6).

11. The appliance as claimed in claim 1, wherein layers (32; 320) which are to be removed or separated can be just detached or separated sufficiently far, by means of the laser diodes (1*a*, . . . , 1*h*), that they can be mechanically detached by means of a tool (4*c*; 4*e*).

12. The appliance as claimed in claim 11, wherein the tool (4*e*) has two blades which can be displaced in such a manner with respect to one another that a coated element (3; 300) can be severed or a layer (32; 320) of the coated element (3; 300) can be maintained.

13. The appliance as claimed in claim 1, wherein a vacuum unit (400) is provided, which is suitable for generating an airflow which is used at least one of to cool the mounting body (2*b*), which may be provided with cooling elements (22), and to remove at least one of vapors and particles which are released.

14. The appliance as claimed in claim 1, wherein appliances or appliance parts (4*a*, 4*b*, 4*f*, 4*g*) are provided, by means of which the element (3; 30; 300) which is to be processed can be conveyed into the position which is provided for the processing and held in that position.

15. The appliance as claimed in claim 1, wherein an installation (100, 101) is provided, by means of which the appliances or appliance parts (4*a*, 4*b*) for positioning and holding the element (3; 30; 300) and the appliances or appliance parts (7, 8, 10) for driving the mounting body (2; 5) and/or the ring (6) can be controlled.

16. The appliance as claimed in claim 1, wherein an installation (100, 101) is provided, by means of which the power of individual laser diodes (1) can be controlled in such a manner that annular separation locations (33*e*, 33*f*) or elongate slots (33*g*) can be applied or sleeve- or window-like areas within the insulating material (32) can be removed.

* * * * *